June 25, 1968  R. J. ALLISON  3,389,754
HARROW FOR USE WITH FARM PLANTING EQUIPMENT
Filed Sept. 9, 1965
FIG 1
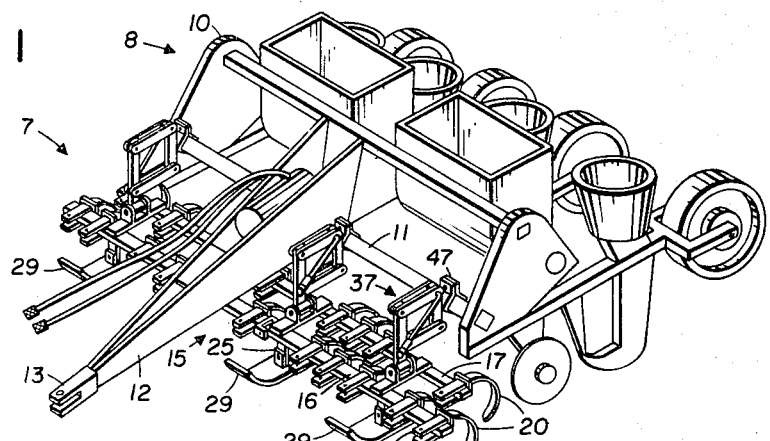
FIG 2
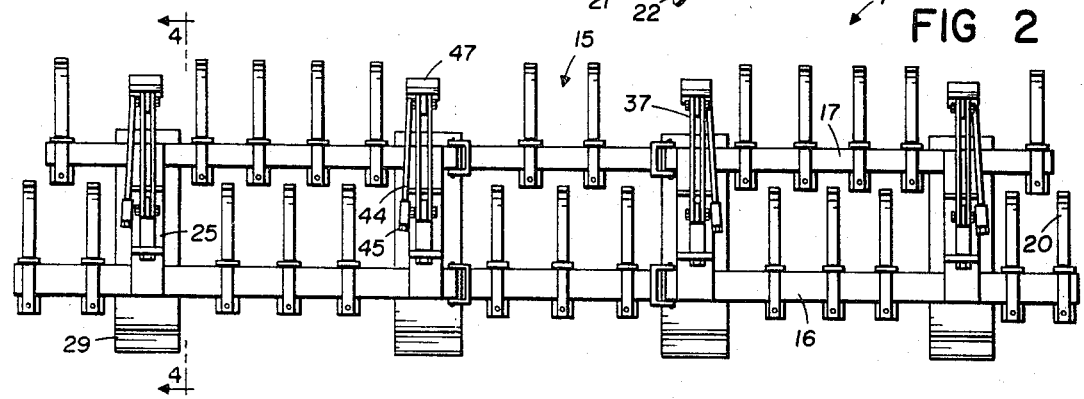
FIG 3
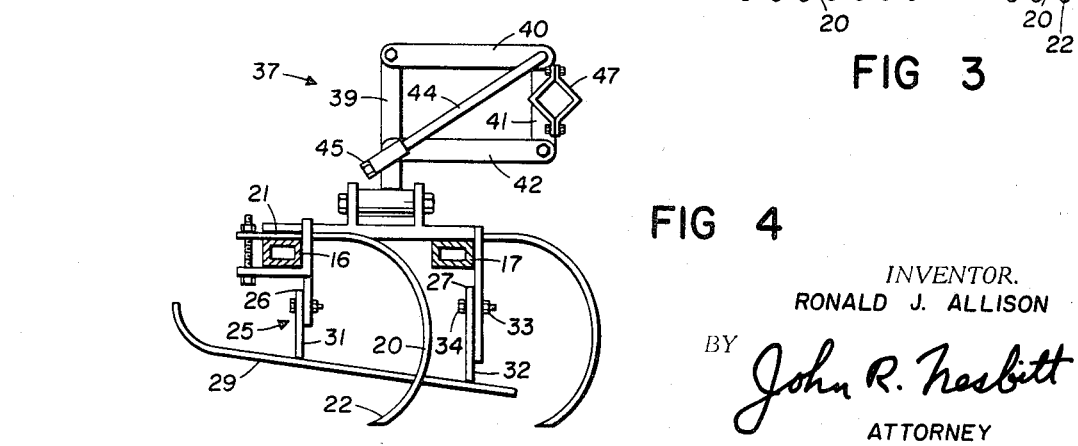
FIG 4
INVENTOR.
RONALD J. ALLISON
BY John R. Nesbitt
ATTORNEY 3,389,754
HARROW FOR USE WITH FARM PLANTING EQUIPMENT
Ronald J. Allison, 108 S. 4th St., Wolcott, Ind. 47995
Filed Sept. 9, 1965, Ser. No. 486,092
1 Claim. (Cl. 172—389)

ABSTRACT OF THE DISCLOSURE

A harrow for attachment to farm planting equipment. The harrow has skid runners supporting a horizontal bar with depending spaced teeth, the harrow being attached to the farm planting equipment through an adjustable attachment device.

---

This invention relates to a harrow and more particularly to a harrow for use with farm planting equipment.

Preparing a field for planting has been, in the past, a time consuming operation since the field not only had to be plowed but then had to be followed by discing or dragging or both. If a rain occurred during field preparation, it often became necessary to drag or disc the ground prior to planting even though this might have been done prior to the rain.

While attempts have been made to solve this problem by providing a harrow that could be used with planting equipment to avoid the necessity for discing or dragging, these attempts have not provided a completely satisfactory solution to the problem either because of the necessity of extensive reconstruction of the planting equipment, the cumbersome harrow equipment utilized, or the inability of the utilized harrow to satisfactorily prepare the ground for planting.

It is therefore the object of this invention to provide a harrow that is particularly well suited for use with farm planting equipment.

It is another object of this invention to provide a harrow that is simple in design yet capable of satisfactorily preparing the ground for planting.

It is still another object of this invention to provide a harrow that can be quickly attached to farm planting equipment without necessitating any change or reconstruction of said farm planting equipment.

With these and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiment herein disclosed in the invention may be included as come within the scope of the claims.

The accompanying drawing illustrates one complete example of the embodiment of the invention constructed according to the best mode so far devised for the practical application of the principles thereof, and in which:

FIGURE 1 is a perspective view of the harrow of this vention as shown attached to conventional farm planting apparatus;

FIGURE 2 is a top view of the harrow of this invention as shown in FIGURE 1;

FIGURE 3 is a front view of the harrow of this invention as shown in FIGURE 2;

FIGURE 4 is a cross-sectional view taken through the lines 4—4 of FIGURE 2.

Referring now to the drawings in which like numerals have been used for like characters throughout, the numeral 7 indicates generally the harrow of this invention which is shown in FIGURE 1, attached to conventional farm planting apparatus 8.

As shown in FIGURE 1, farm planter 8 has a frame 10 which includes a horizontal bar 11 which extends substantially entirely across the front of the planter. As is conventional, a tongue 12 protrudes forwardly from the planter and is adapted at its free end 13 to be connected to a tractor or the like (not shown).

The harrow of this invention is directly attached, as shown in FIGURE 1, to the planting apparatus and is sufficiently compact to fit below the tongue 12 so that the planting apparatus need not be altered or reconstructed in any manner.

As shown best in FIGURES 2 and 3, harrow 7 has a frame 15 which includes a pair of bars 16 and 17, which bars are parallel to one another, spaced from one another, and equi-distant from the ground. Both forward bar 16 and rear bar 17 have a plurality of teeth 20 spaced along the bar. As shown best in FIGURE 2, teeth 20 are spaced so that as the harrow is moved along the ground the teeth on the rear bar will engage the ground between areas engaged by the teeth on the front bar. Teeth 20 may be conventional spring teeth having a mounting end 21 attached to one of the harrow bars and having a uniformly curved central portion terminating at a ground engaging end 22, as shown best in FIGURE 4.

The harrow frame 15 is supported by a plurality of support members 25, each of which includes a pair of depending supports 26 and 27 connected to front and rear bars 16 and 17, respectively. As shown best in FIGURE 4, each support member 25 has connected thereto a skid runner 29, which runner, of course, engages the ground. As shown best in FIGURE 3, since the spring teeth extend below the skids, the ground engaging ends of the teeth extend into the ground while the skids remain essentially on the surface of the ground. As shown in FIGURE 4, each skid runner may have two upwardly extending bars 31 and 32 adapted to be connected to support members 25 and 26, respectively as, for example, by means of nut and bolt 33–34.

At each connection of the harrow frame with a support member, an attachment means 37 extends upwardly and rearwardly therefrom to connect the harrow to the planting equipment. Attachment means 37 consists of four legs, or links, 39, 40, 41 and 42 connected as shown best in FIGURE 4. An adjustment rod 44 is connected between the junction of arms 40 and 41 and the junction of arms 39 and 42. At the junction of arms 39 and 42, rod 44 is connected by means of a sleeve through which the rod is slidably received. To complete the arrangement, a nut 45 is connected to the end of the adjustment rod below the sleeve.

A mounting clamp 47 is fastened to arm 41 and the position of this mounting clamp, of course, is adjusted by adjustment of the effective length of rod 44. Mounting clamp 47 is connected in conventional fashion to horizontal bar 11 of the planting equipment. When connected to the farm planting equipment, attachment means 37 also acts as a shock absorber.

In operation, the harrow is easily connected to the existing planting equipment by merely placing the harrow beneath the tongue of the planting equipment, attaching the harrow to the horizontal bar of the planting equipment (preferably by nuts and bolts at each side of the mounting clamp 47). The harrow is then ready for use and will be used immediately ahead of the planting equipment and in no way requires reconstruction of the said planting equipment.

While twenty-five teeth have been indicated as used in the compact harrow shown in the drawing, and while four support members and attachment means have also been shown, it is to be realized that the number of teeth, support members, and attachment means can be varied to suit the particular needs without departing from the intended scope of this invention.

In view of the foregoing, it should be obvious to one skilled in the art that the harrow of this invention provides a heretofore unavailable harrow which is particularly well suited for use with conventional farm planting equipment and can be used without altering or reconstructing said equipment.

What is claimed is:

1. A harrow for use with farm planting apparatus having substantially, horizontally positioned bar extending across the front of said apparatus, said harrow comprising: a frame member having front and rear substantially horizontally positioned bars; a plurality of support members spaced along said frame member; a plurality of skid runners each of which is connected to a different one of said support member, said skid runners engaging the ground to hold the frame member a predetermined distance from the ground; a plurality of spring teeth connected alternately to said front and rear bars of said frame member, each of said teeth extending below said skid runners when said harrow is in operating position; and a plurality of attachment means spaced along said frame member and attached thereto at points common to said support members, said attachment means being adjustable to allow said frame to be attached to bars on said planting apparatus at different heights, and said attachment means including four legs each of which is pivotably connected at opposite ends to a different one of said legs and wherein said legs are adjusted by an adjustable length rod connected between two non-adjacent pivotable connections of said legs.

References Cited

UNITED STATES PATENTS

| | | | |
|---|---|---|---|
| 447,763 | 3/1891 | Coombs | 172—142 X |
| 2,669,918 | 2/1954 | Lawhorn | 172—298 |
| 2,677,321 | 5/1954 | Ferguson | 172—277 X |
| 2,886,114 | 5/1959 | Peterson | 172—298 X |

ABRAHAM G. STONE, *Primary Examiner.*

J. R. OAKS, *Assistant Examiner.*